FLAW TESTING SYSTEM FOR ENDLESS MAGNETIC STORAGE BELTS

Filed June 9, 1967 3 Sheets-Sheet 1

INVENTORS
Louis G. Metzger &
Eleuthere Poumakis
BY
Lane, Aitken, Dunner & Ziems
ATTORNEYS

FLAW TESTING SYSTEM FOR ENDLESS MAGNETIC STORAGE BELTS

Filed June 9, 1967 3 Sheets-Sheet 2

INVENTORS

Louis G. Metzger & Eleuthere Poumakis

BY

Lane, Aitken, Dunner & Ziems

ATTORNEYS

INVENTORS
Louis G. Metzger &
Eleuthere Poumakis
BY
Lane, Aitken, Dunner & Ziems
ATTORNEYS United States Patent Office 3,465,241

Patented Sept. 2, 1969

3,465,241
FLAW TESTING SYSTEM FOR ENDLESS MAGNETIC STORAGE BELTS

Louis G. Metzger, New York, N.Y., and Eleuthere Poumakis, Danville, Calif., assignors to Potter Instrument Company, Inc., Plainview, N.Y., a corporation of New York Filed June 9, 1967, Ser. No. 645,037
Int. Cl. G01r 33/12
U.S. Cl. 324—37 2 Claims

ABSTRACT OF THE DISCLOSURE

This specification discloses a system for testing endless magnetic belts used for storing digital information. The system tests the endless belts by recording with transducers which are gradually moved across the tape as the tape is driven past the transducers at a constant speed. Read out transducers are gradually moved across the tape with the recording transducers and the read out transducers reproduce the signals recorded by the recording transducers. If the signals reproduced by any of the reading transducers rises above a maximum value or falls below a minimum value the system will indicate a tape flaw. In this manner the entire recording surface of the endless belt is tested for flaws except in the region of the splice, which is eliminated from the test by logic circuitry. A circuit is provided which automatically stops the gradual movement of the transducers in response to detecting a flaw and backs up the transducers to the lateral position where the flaw was detected.

BACKGROUND OF THE INVENTION

This invention relates to magnetic information storage tape systems, and more particularly, to a system for testing endless belts of magnetic storage tape on which a large number of tracks of digital information can be recorded.

In copending application Ser. No. 535,747 entitled "Random Access Memory" filed Mar. 21, 1966, invented by Andrew Gabor, there is disclosed a random access magnetic storage system in which information is stored on endless belts of magnetic tape. Each endless belt has defined thereon a large number of tracks in which the information is recorded. The exact location of the tracks on the endless belts will vary with each individual storage system. Accordingly, it is important that the entire surface of each endless belt be free of flaws except in the region of the splice where no information is recorded. The present invention provides a system which will test the entire surface of the magnetic belt.

SUMMARY OF THE INVENTION

The system of the present invention operates to test the endless belts by recording with transducers, which are gradually moved across the tape as the tape is driven past the transducers at a constant speed. Read out transducers are gradually moved across the tape with the recording tarnsducers and the read transducers reproduce the signals recorded by the recording transducers. If the signals reproduced by any of the reading transducers rises above a maximum value or falls below a minimum value the system will indicate a tape flaw. Because the transducers are moved gradually across the magnetic tape, the entire recording surface of the endless belt is tested for flaws except in the region of the splice, which is eliminated from the test by logic circuitry. A circuit is provided which automatically staps the gradual movement of the transducers in response to detecting a flaw and backs up the transducers to the lateral position where the flaw was detected so that the effect of the flaw may be observed on an oscilloscope and the flaw may be observed visually.

Accordingly, an object of the present invention is to provide an apparatus for testing magnetic storage mediums such as endless belts of magnetic tape for flaws.

Another object of the present invention is to facilitate flaw detection in magnetic recording mediums such as endless belts magnetic tape.

A further object of the present invention is to provide a system which will test the entire area of a magnetic storage medium for flaws.

Further objects and advantages of the present invention will become readily apparent as the following detailed description of the invention unfolds and when taken in conjection with the drawings, wherein:

DESCRIPTION OF THE PREFERRED EMBODIMENT

Figure 1:
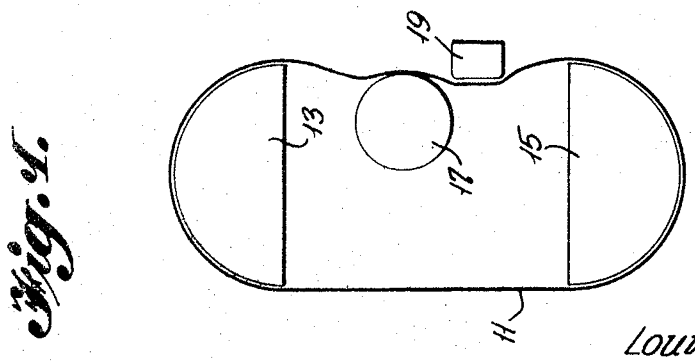
FIG. 1 is a sectional view of the apparatus of the system of the present invention showing how an endless belt under test is driven past the transducers which provide the testing operation.

As shown in FIG. 1, the endless belt of magnetic tape under test is designated by the reference number 11. The tape is supported in the form of an oval by two turnarounds 13 and 15. The tape is continuously driven by a capstan 17 past a transducing head 19, which is located in transducing relationship with the tape. The tape is drawn into contact with the capstan by means of a vacuum in the same manner as disclosed in the aforementioned copending application and floats over the transducing head and the turn-arounds on air bearings.

As the tape is driven past the tranducing head 19, recording transducers mounted in the transducing head 19 record signals on a tape and reading transducers read out the signals recorded on the tape to perform the testing operation.

Figure 2:
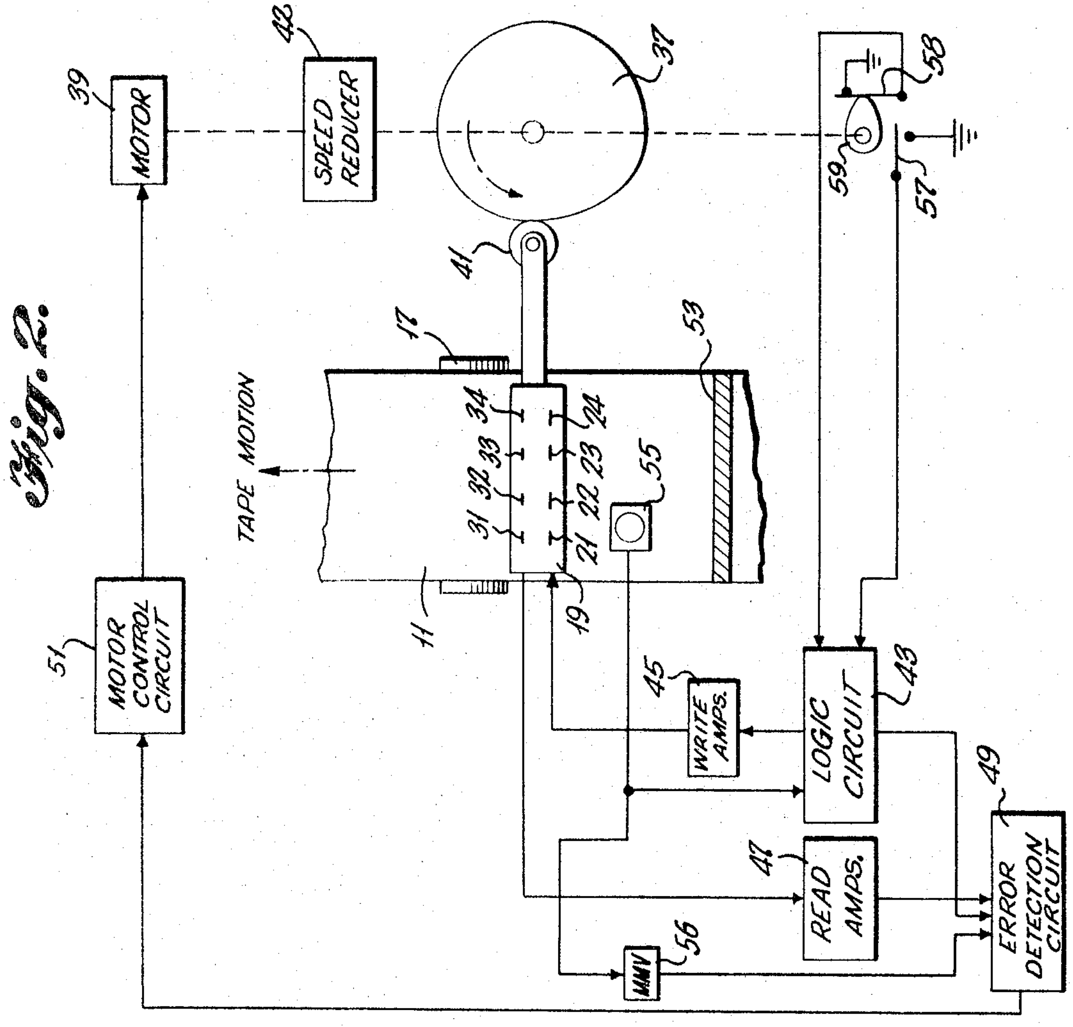
FIG. 2 is a block diagram illustrating the system of the present system.

As shown in FIG. 2, the recording head 19 has four recording transducers 21–24 mounted therein. These recording transducers each record a track 17 mils wide. Also mounted in the transducing head 19 are four reading transducers 31–34 which read out from tracks, which are three mils wide and which would be found directly in the center of the tracks in which the recording transducers 21–24 record. The recording transducers as well as the reading transducers are positioned so that their centers are one-half inch apart. A cam 37 driven by a motor 39 is provided to move the transducing head 19 gradually transversely across the tape. A cam follower 41 riding on the surface of the cam 37 and connected to the transducing head 19 provides the desired motion of the transducing head 19 in accordance with the rotation of the cam 37. The cam is shaped so that the transducing head 19 will be moved across the tape for 270 degrees of rotation of the cam and then is returned to its initial position in the final 90 degrees of rotation of the cam. The motor 39 drives the cam 37 through a speed reducer 42 at a speed such that the transducing head 19 moves two mils across the tape for each revolution of the endless belt during the first 270 degrees rotation of the cam.

A logic circuit 43 controls the application of signals by write amplifiers 45 to the recording transducers 21–24. During the first 270 degrees that the cam 37 is being rotated, a test signal in the form of a continuous succession of binary ones will be applied to the recording transducers 21–24 every third revolution of the endless belt 11. The read amplifiers will continuously read out the recorded signals and applying them to an error detection circuit 49, which detects whether any of the signals applied thereto by the read amplifiers 47 rise above 1.6 volts or fall below 0.5 volt. If any of the applied signals rise above the maximum or fall below the minimum, the error detection circuit 49 will produce a signal indicating a flaw and apply this signal to a motor control circuit 51. The error detection circuit 49 is inhibited from producing the flaw indicating signal while the splice where the endless belt is joined together is passing under the transducing head 19. The error detecting circuit 49 is also inhibited while a small portion of the tape on each side of the splice is passing under the transducing head 19 as in these small portions recording does not take place and the portions do not need to be flawless. As shown in FIG. 2, the splice is designated by the reference number 53. The approach of the splice to the transducing head 19 is detected by a photocell 55 so that the error detection circuit can be inhibited from producing a flaw indicating output signal at the proper time. Each time the splice passes by the photocell, the photocell will produce an output pulse which is applied to monostable multivibrator 56. The monostable multivibrator will apply a square wave pulse to the error detector to disable the error detector for a predetermined time, during which the splice 53 will pass under the head 19. The pulses produced by the photocell 55 are also applied to the logic circuit 43 to control the application of the test signal to the write amplifiers to be only on every third revolution of the endless belt 11.

During the last 90 degree rotation of the cam 37 when the transducing head 19 is being returned to its initial position the logic circuit 43 will apply a signal to the write amplifiers 45 to erase the signals recorded on the endless belt so that when the transducing head gets back to its initial position, in which it is shown in FIG. 2, the tape will be erased.

A cam 59 cooperating with cam operated switches 57 and 58 is connected to the cam 37 to rotate therewith. The cam 59 will cause the cam operated switch 57 to close momentarily and send a pulse to the logic circuit 43 when the cam 37 has completed the first 270 degrees of its rotation from its initial position, or in other words, when the head 19 has moved from right to left to the limit of its travel across the endless belt 11 during the testing operation. The cam 59 will momentarily close the switch 58 causing a pulse to be sent to the logic circuit 43 when the cam 37 has completed the remaining 90 degrees of its rotation back to its initial position, or in other words, when the head 19 has moved from left to right to the other limit of its travel after the head has transversed across the tape 11 during the erasing phase of the operation. The logic circuit 43 responds to the pulses from the cam operated switches 57 and 58 to apply the test signal to the write amplifiers 45 only during the first 270 degrees of rotation of the cam 37 from its initial position while the head 19 is moving across the tape 11 from right to left and to apply the erasing signal to the write amplifiers 45 only during the last 90 degrees of rotation of the cam 37 while the head 19 is transversing back across the tape to its initial position from left to right.

When the error detection circuit 49 applies a signal to the motor control circuit 51 indicating that a flaw has been detected, the motor control circuit 51 will stop the motor 39 and will drive it in a reverse direction so that the transducing head and reading transducer is moved back to the point at which the error was detected and an oscilloscope can then be used to observe the effect of the flaw on the signal and also the flaw can be inspected visually.

Figure 3:
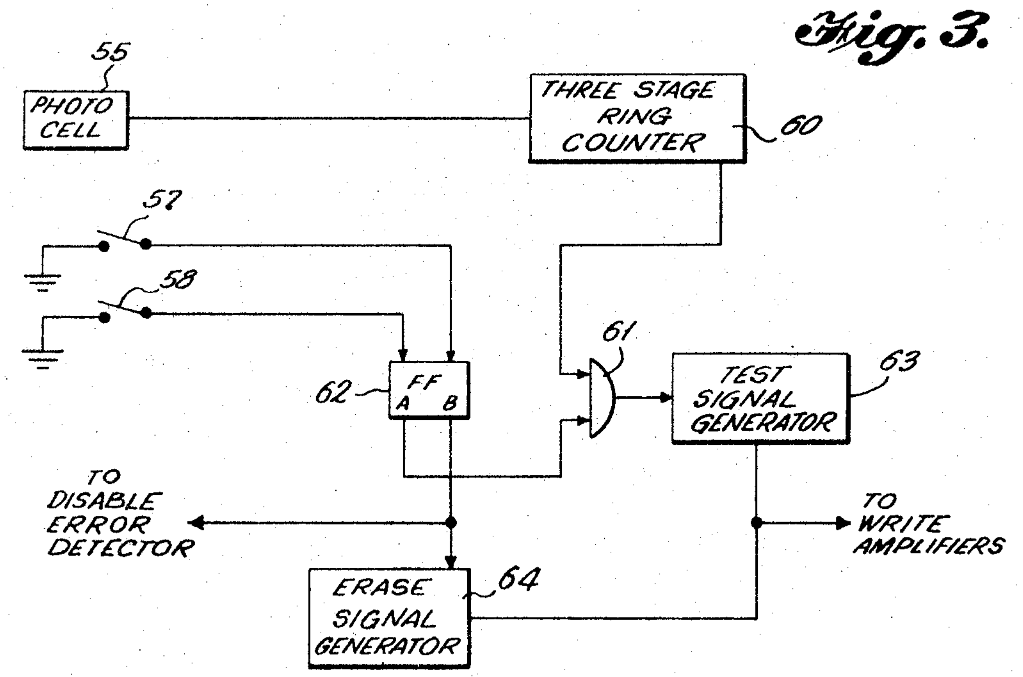
FIG. 3 is a block diagram illustrating details of logic circuitry used in the system of the present invention.

As shown in the block diagram of FIG. 3, which illustrates the details of the logic circuit 43, the pulses produced by the photocell 55 are applied to a three-stage ring counter 60. After every third applied pulse, the three-stage ring counter 60 will apply an enabling signal to a gate 61 and will continue applying this signal to the gate 61 until the next pulse is produced by the photocell 55. As a result, the three-stage ring counter 60 will apply an enabling signal to the gate 61 during every third revolution of the endless belt 11. While the head 19 is gradually moving across the endless belt 11 from right to left as seen in FIG. 2 at the two mils per revolution rate, a flip-flop 62 will be in its A state and will also apply an enabling signal to the gate 61. Thus, while the head 19 is going from right to left across the endless belt 11 gradually at a rate of two mils per revolution, the gate 61 will continuously receive an enabling signal from the flip-flop 62 and will receive an enabling signal from the three-stage counter 60 during every third revolution. When the gate 61 receives enabling signals from the flip-flop 62 and from the three-stage counter 60, it will apply an enabling signal to a test signal generator 63, which in response to receiving the enabling signal from the gate 61 will apply the test signal to the write amplifiers 45. Thus, a test signal will be applied to the write amplifiers 45 during every third revolution as the head 19 moves from right to left across the endless belt 11 at a rate of two mils per revolution.

When the cam 37 has rotated through 270 degrees from its initial position so that the head 19 has reached the limit of its displacement from right to left, the cam operated switch 57 will be momentarily closed and will apply a pulse to the flip-flop 62 to set the flip-flop 62 in its B state. As a result, the gate 61 will no longer receive an enabling signal from the flip-flop 62 and the test signal generator 63 will stop applying the test signal to the write amplifier 45. When the flip-flop 62 is in its B state, it will apply an enabling signal to an erase signal generator 64 which in response to receiving this enabling signal will apply an erase signal to the write amplifiers 45. Thus, while the cam 37 is rotating through the remaining 90 degrees of its revolution back to its initial position and the head 19 is moving relatively rapidly from left to right across the endless belt 11, an erase signal will be applied to the recording heads. While the flip-flop 62 is in its B state, it also applies a signal to the error detector 49 to disable it so that the error detector will not produce a flaw indicating signal during the erasing phase of the operation. When the cam 37 gets back to its initial position as shown in FIG. 2, the cam operated switch 58 will be momentarily closed to apply a pulse to the flip-flop 62 switching the flip-flop 62 back to its A state. As a result, the erase signal generator 64 will no longer receive an enabling signal and accordingly will not apply the erase signal to the write amplifiers 45. The flip-flop 62 being again in its A state will again apply an enabling signal to the gate 61 so that the system is ready to perform another complete test cycle.

Figure 4:
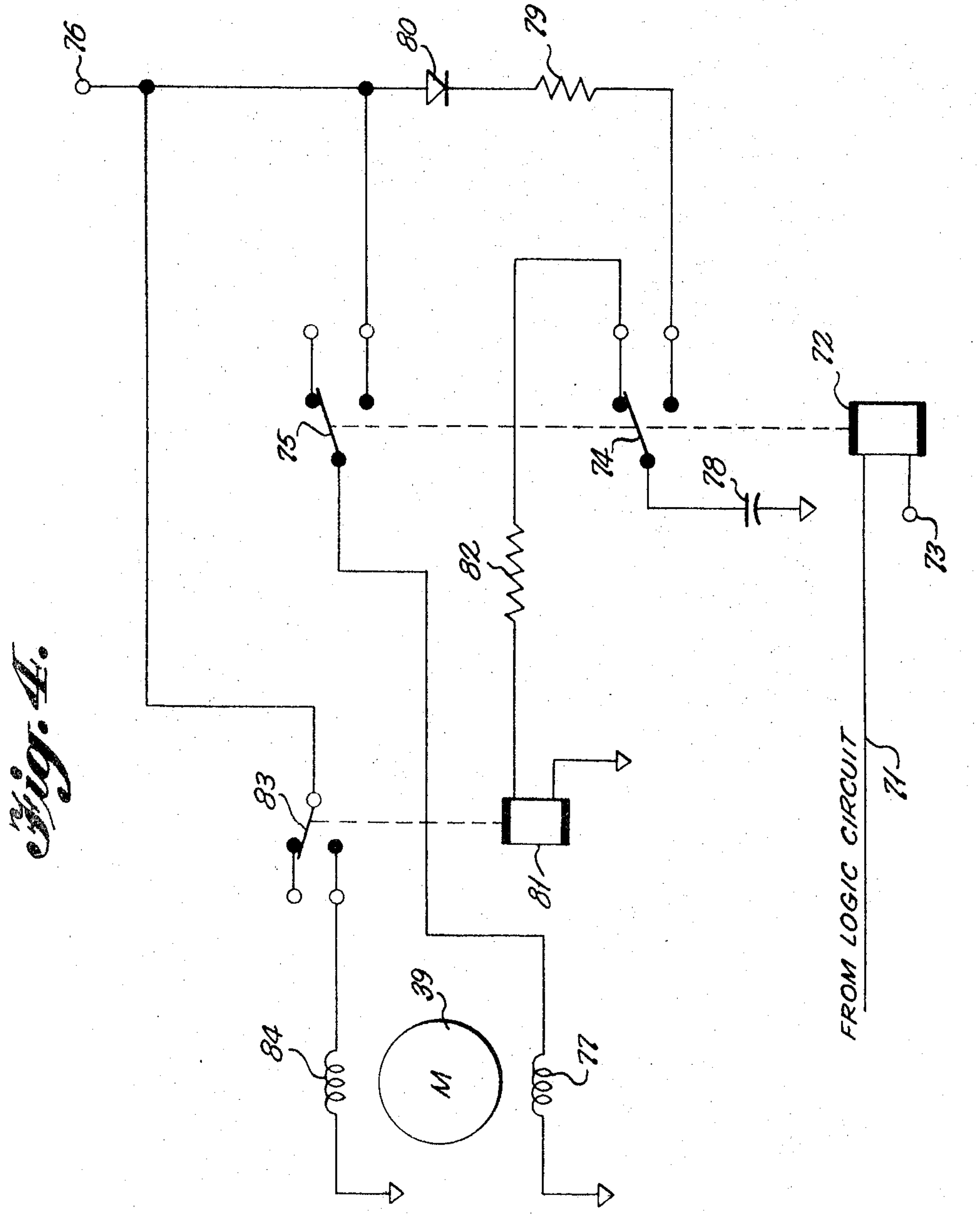
FIG. 4 is a circuit diagram illustrating in detail the circuits for controlling the motor which drives the tape and gradually moves the transducers across the tape.

As shown in FIG. 4, which illustrates the motor control circuit 51 in detail, the error detector 49 will normally apply a ground signal voltage to the motor control circuit 51 over a channel 71 but will apply a minus 15 volt signal to the channel 71 whenever the error detector 49 detects a flaw by reason of the signal applied thereto by one of the read amplifiers 47 rising above 1.6 volts or falling below 0.5 volt and the error detector 49 is not inhibited in response to a pulse from the photocell 55. The lead 71 is connected to one side of a relay 72, the other side of which is connected to a source of minus 15 volts applied to a terminal 73. Accordingly the relay 72 will normally be energized by current flowing from the 15 volt source applied at terminal 73 to the ground applied to the lead 71 by the error detector. However, when the error detector 49 detects a flaw and applies a minus 15 volt signal to the lead 71, the relay 72 will have 15 volts applied to each side thereof and accordingly will be deenergized. As a result, the relay 72 will release its contacts to the position in which they are shown in FIG. 4. The relay 72 has two sets of contacts 74 and 75. When the relay 72 is energized the contacts 75 connect an AC source of 115 volts applied at a terminal 76 to one side of a winding 77 of the motor 39. The other side of the winding 77 is connected to AC common. Accordingly, when the relay 72 is energized the winding 77 of the motor 39 will be energized. When the winding 77 is energized in this manner the motor 39 will drive the cam 37 forward in a counter-clockwise direction.

When the relay 72 is energized the contacts 74 will connect one side of an 80 microfarad capacitor 78 to the 115 volt source applied at terminal 76 through a 220 ohm resistor 79 and a rectifying diode 80. The diode 80 only passes positive half cycles from the source 76 to the capacitor 78 so as to charge the capacitor 78 in a positive direction. When the relay 72 becomes deenergized upon the error detector 49 detecting a flaw in the endless belt 11, the contacts 75 will disconnect the winding 77 from the 115 volt source at terminal 76 thus deenergizing the winding 77. Also as a result of the relay 72 being deenergized the contacts 74 will connect the capacitor 78 to one side of a relay 81 through a 1.36 kilohm resistor 82. The other side of the relay 81 is connected to AC common. Accordingly the capacitor 78 will discharge through the resistor 82 and the relay 81 energizing the relay 81. When the relay 81 becomes energized it closes its contacts 83, which will connect the 115 volts applied at terminal 76 to one side of a winding 84 of the motor 39. The other side of the winding 84 is connected to AC common. When the armature winding 84 is energized in this manner, the motor 39 will drive the cam 37 in reverse in a clockwise direction. Thus, when a flaw is detected the motor 39 will be energized in a reverse direction to move the transducing head 19 back toward the position at which the error was detected. As the capacitor 78 discharges through the relay 81, the current through the relay 81 will drop until the contacts 83 again open so that both windings of the motor 39 are deenergized and the transverse motion of the transducing head is stopped. The values of the resistor 82 and the capacitor 78 are selected so that the time that the relay 81 maintains its contacts 83 closed is just long enough to bring the transducing head back to the lateral position at which the flaw was detected. The head 19 will then remain at the position at which the flaw was detected as the capstan continuously drives the endless belt 11 past the transducers. The flaw may then be examined by means of an oscilloscope or the tape can be stopped and the flaw can be examined visually.

Figure 5:
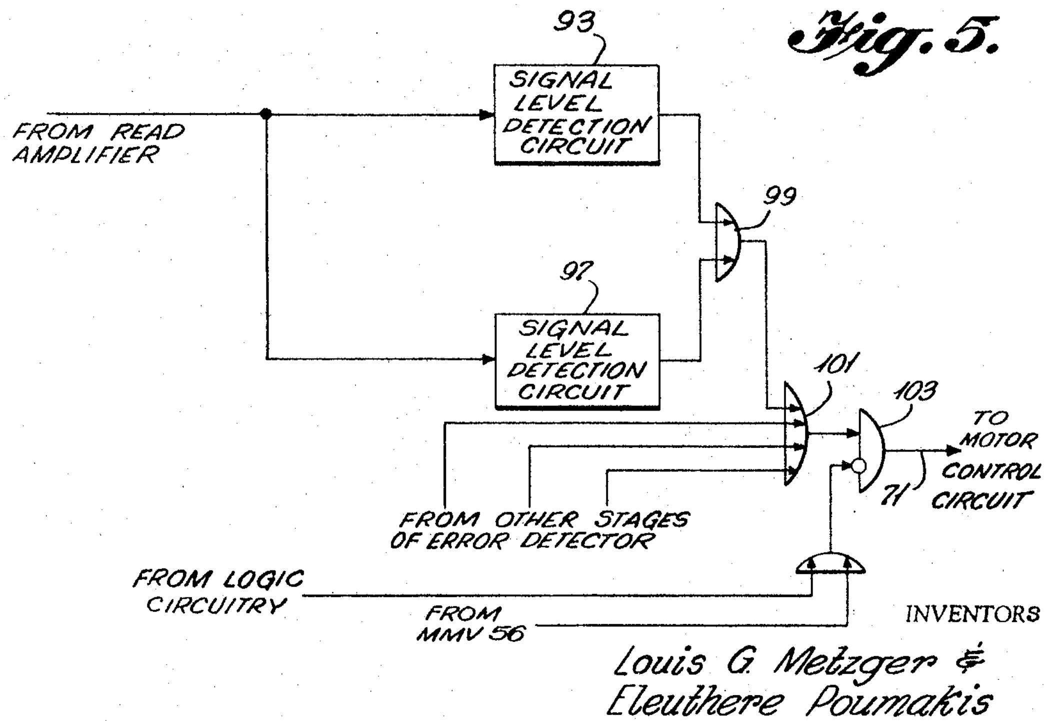
FIG. 5 is a block diagram illustrating details of a detection circuit used in the system of the present invention.

FIG. 5 illustrates a stage of the error detection circuit, there being a similar stage to receive the output signal from each reading transducer. The output signal from a reading transducer, after being amplified by one of the read amplifiers 47, is applied to a signal level detection circuit 93 and to a signal level detection circuit 97. The signal level detection circuit 93, which may be in the form of a Schmitt trigger detects whether the applied signal rises above 1.6 volts. The signal level detection circuit 93 upon detecting that the applied input signal has risen above a voltage level of 1.6 volts will produce a minus 15 volt output signal which will be passed through an OR gate 99. The signal level detection circuit 97 detects whether the applied signal voltage falls below 0.5 volt.

The detector 97 may also be a Schmitt trigger fed by a rectifying and smoothing circuit. If the signal voltage applied to the signal detection circuit 97 ever falls below 0.5 volt, the signal detection circuit 97 will produce a minus 15 volt output signal which also will be passed through the OR gate 99. Thus, the OR gate 99 will produce a minus 15 volt output signal if the signal applied to the input rises above 1.6 volts or falls below 0.5 volt. The signal level detectors 93 and 97 and the OR gate 99 make up one stage of the error detection circuit 49 and a similar stage is provided to receive the output from each of the read transducers after being amplified by the read amplifiers 47. The outputs from each stage of the error detection circuit are applied to an OR gate 101 which will produce a minus 15 volt output signal if it receives a minus 15 volt signal from any stage of the error detector. The output of the OR gate 101 is connected to a gate 103, the output of which is connected to the channel 71 of the motor control circuit 51. The gate 103 is normally enabled and will pass an applied miuns 15 volt signal unless it is inhibited by the square wave voltage produced by the monostable multivibrator 56 or by the signal applied by the logic circuit 43 when the erase signal is being applied to the recording heads. These two signals are applied to the inhibit input of the gate 103 through an OR gate 105. Thus, if any of the output signals of the read transducers rises above 1.6 volts or falls below 0.5 volt other than when the splice is passing under the read transducers or during the erase portion of the test cycle, a minus 15 volt signal will be passed through the gate 103 to the channel 71 causing the relay 72 to be deenergized.

The system of the present invention thus will test the entire surface of the endless belt and upon the detection of the flaw will automatically bring the head 19 back to the position at which the flaw was detected so that the flaw may be examined.

What is claimed is:

1. A system for testing a magnetic storage medium for flaws comprising:

means for continuously revolving the medium to be tested, a readout transducer positioned to read out from said medium as said medium revolves, means for moving said transducer across said medium with respect to the direction of movement of said medium, means responsive to an output signal produced by said transducer for detecting flaws in said medium, means responsive to said flaw detecting means for stopping the transverse movement of said transducer, means for determining the movement of said transducer after the detection of a flaw and prior to stopping, and means including said determining means for returning said transducer to a region in which a flaw has been detected.

2. A testing system as in claim 1 further including means for maintaining said transducer stationary after it returns to the region of a detected flaw.

References Cited

UNITED STATES PATENTS

| | | | |
|---|---|---|---|
| 2,889,513 | 6/1959 | Callan et al. | 324—37 |
| 2,922,106 | 1/1960 | Oates et al. | 324—34 |

RUDOLPH V. ROLINEC, Primary Examiner

A. E. SMITH, Assistant Examiner

U.S. Cl. X.R.

179—100.2; 324—34